(12) United States Patent
Hachey et al.

(10) Patent No.: US 7,793,834 B2
(45) Date of Patent: Sep. 14, 2010

(54) FINANCIAL TRANSACTION CARD WITH NON-EMBOSSED, RAISED INDICIA

(75) Inventors: John Richard Hachey, Elk Grove, CA (US); LeRoy Kevin Isaac, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/058,542

(22) Filed: Mar. 28, 2008

(65) Prior Publication Data

US 2009/0200385 A1 Aug. 13, 2009

Related U.S. Application Data

(63) Continuation-in-part of application No. 29/303,622, filed on Feb. 13, 2008, now Pat. No. Des. 578,159.

(51) Int. Cl.
G06K 5/00 (2006.01)
(52) U.S. Cl. ........................ 235/380; 235/379; 235/487; 235/488; 235/493
(58) Field of Classification Search .................. 235/487, 235/488, 493, 379, 380
See application file for complete search history.

(56) References Cited

U.S. PATENT DOCUMENTS

| | | | |
|---|---|---|---|
| 3,162,468 A | | 12/1964 | Jonker |
| 3,217,643 A | * | 11/1965 | Crissy et al. ................. 430/306 |
| 3,412,493 A | | 11/1968 | French |
| 3,972,138 A | | 8/1976 | Armbruster et al. |
| 4,404,764 A | | 9/1983 | Wills et al. |
| D276,820 S | | 12/1984 | Lill |
| D284,581 S | | 7/1986 | Peterson |
| 4,761,542 A | * | 8/1988 | Kubo et al. ................. 235/379 |
| 5,844,230 A | * | 12/1998 | Lalonde ....................... 235/487 |
| D419,185 S | | 1/2000 | Teter et al. |
| 6,267,598 B1 | | 7/2001 | Allen et al. |
| 6,328,341 B2 | * | 12/2001 | Klure ........................... 283/62 |

(Continued)

FOREIGN PATENT DOCUMENTS

JP 7314964 A 12/1995

(Continued)

OTHER PUBLICATIONS

Office Action, mailed May 1, 2008, U.S. Appl. No. 29/303,622, filed Feb. 13, 2008, inventor John Richard Hackey.

(Continued)

*Primary Examiner*—Michael G Lee
*Assistant Examiner*—Michael Andler
(74) *Attorney, Agent, or Firm*—May M. Mowzoon; Quarles & Brady LLP

(57) ABSTRACT

A financial transaction card has a first major surface on one side and a second major surface on an opposite side. A first set of raised indicia projects outwardly from the first major surface. A second set of raised indicia projects outwardly from the second major surface and is directly contralateral with the first set of raised indicia. The second major surface is devoid of any indication of the first set of raised indicia and the first major surface is devoid of any indication of the second set of raised indicia. Each indicium denotes an alphabetic letter or a number and in one embodiment is a Braille character.

26 Claims, 4 Drawing Sheets

U.S. PATENT DOCUMENTS

| | | | |
|---|---|---|---|
| 6,345,766 B1 * | 2/2002 | Taskett et al. | 235/493 |
| D467,247 S | 12/2002 | Pentz | |
| D485,296 S | 1/2004 | Li | |
| D493,195 S | 7/2004 | Creighton | |
| D565,097 S | 3/2008 | Brown | |
| D565,364 S | 4/2008 | Crossley et al. | |
| 2008/0203171 A1 * | 8/2008 | Phillips | 235/492 |

FOREIGN PATENT DOCUMENTS

WO    WO 2006/107862 A2    10/2006

OTHER PUBLICATIONS

Notice of Allowance, mailed Jun. 17, 2008, U.S. Appl. No. 29/303,622, filed Feb. 13, 2008, inventor John Richard Hackey.

* cited by examiner

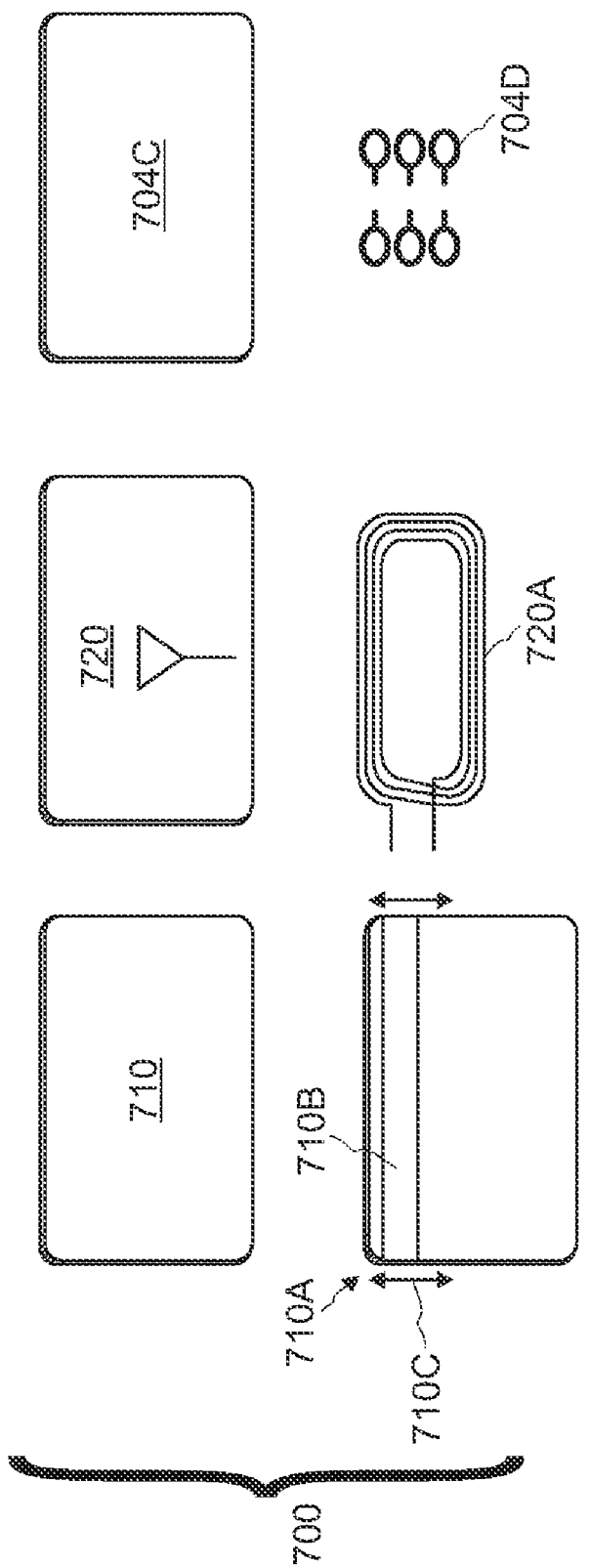

ized by the United States Patent and Trademark Office (USPTO).

FINANCIAL TRANSACTION CARD WITH NON-EMBOSSED, RAISED INDICIA

CROSS-REFERENCE TO RELATED APPLICATIONS

This is a continuation-in-part application of U.S. Design Patent Application Ser. No. 29/303,622, titled "Braille Financial Transaction Card," filed on Feb. 13, 2008, which is incorporated herein by reference.

FIELD OF THE INVENTION

The present invention relates to a financial transaction card used in financial transactions, such as prepaid transaction cards, debit cards and credit cards; and more particularly to raised characters that encode information on a surface of the financial transaction card.

BACKGROUND

Credit cards, debit cards, prepaid transaction cards, gift cards, and other similar electronic tokens are convenient tools for consumers to complete a variety of financial transactions. Consumers use these electronic tokens to pay for daily expenses such as food, lodging, travel, and gasoline. The travel and tourism industry benefit greatly from the use of credit cards because in order to make hotel or rental car reservations, a consumer must provide a valid credit card (or in some instances a debit card) to reserve the desired hotel room or motor vehicle.

The credit card industry has grown considerably as electronic commerce and technology continues to advance. In the United States alone, there are millions of credit cards in circulation and the use of these cards will continue to grow as technology advances. With the advent of the internet, consumers have the ability to make purchases 24 hours a day from anywhere in the world by purchasing items through a retailer's website or toll free number.

The use of credit cards is particularly prevalent in the United States. Among the users of credit cards are those who are visually impaired. However, the use of credit cards sometimes requires that a consumer read the credit card account numbers or verification numbers from the card. Reading these account numbers can be inconvenient or even impossible for visually impaired individuals. Over ten million visually impaired card holders cannot read account numbers or the verification number for transaction validation purposes.

Presently known techniques for permitting visually impaired individuals to read information, such as on a telephone or in an elevator, involves the use of Braille characters. Automated teller machines (ATM) and other terminals, public transit, elevators offer Braille pads to allow reading of instructions and other relevant information. In this way, the visually impaired individual may interpret the Braille characters on the keypad to facilitate dialing a phone number or accessing a particular floor in a hotel or an apartment. There is no known mechanism that permits the visually impaired individuals to read account and verification numbers on a credit card.

Braille printers and other devices for generating Braille characters on printed documents are generally well known. Automated embossing systems have existed for a number of years. Primarily, these are devices for embossing letters or dots into a sheet of paper or plastic material, such as for embossing lettering into credit card blanks. Among these products are a number of Braille printers which use embossing heads which produce patterns of embossed dimples or dots corresponding to the Braille alphabet. Embossing creates raised elements, or bumps, that project from one surface of an object, such as a card, and a mirror image pattern of indentations on an opposite surface of the object. Embossing a set of characters in a region on one surface precludes embossing another set of characters on the contralateral region, i.e. the corresponding region on the opposite surface, as embossing the later formed set of characters typically obliterates part of the previously formed set.

Credit card issuers must comply with standards promulgated by the International Organization for Standardization (ISO) in Geneva, Switzerland with respect to the dimensions of the credit card and the placement of characters, indicia, and alternative technology on cards. Such prior embossing and imprinting devices have not, however, been suitable for producing Braille characters on credit and debit cards which can be read by a visually impaired person or that complies with the requirements of ISO 7811-3 and ISO 7813 standards for financial transaction cards.

Visually impaired card holders are limited to after-market solutions, such as Braille tape and embossers. These after market solutions require that an adhesive be placed on a tape or other printed material. However, these adhesive tactile solutions violate the ISO 7811-3 and ISO 7813 standards, requiring that alternative technologies can not be placed in areas of the card where they could adversely affect card features, such as the magnetic stripe. Attaching any type of adhesive on a credit card risks depositing adhesive materials in the card readers. In addition, the adhered indicia is easily removed through normal wear and tear by the consumer.

SUMMARY

One implementation incorporates raised indicia directly onto a financial transaction card in addition to the characters defined by the international standards for such cards.

A financial transaction card comprises a thin, planar body having a first major surface and a second major surface on an opposite side of the body from the first major surface. A first set of raised indicia, with each indicium denoting an alphabetic letter or a number, projects away from the first major surface. Wherein the second major surface is devoid of any indication of the first set of raised indicia.

In one implementation, there is a second set of raised indicia, with each indicium denoting an alphabetic letter or a number and projecting away from the second major surface. Wherein the first major surface is devoid of any indication of the second set of raised indicia. Preferably the first set of raised indicia is directly contralateral with the second set of raised indicia.

This type of financial transaction card is particularly well suited for use by visually impaired consumers by utilizing Braille characters as the indicia. As a result, such consumers are able to identify a credit card, account number, credit card verification information, expiration dates and any other promotional or marketing data related to the card without the aid of an aftermarket mechanism, such as Braille characters on paper adhesively applied to the card. With this novel concept a visually impaired person does not have to ask another individual to read information from a card, which for security purposes may expose the consumer to identity theft or other breach of personal information. Additionally, the invention greatly enhances the visually impaired consumers' lives because they are able to independently make financial transactions in stores and online, thereby taking advantage of electronic commerce technology.

In another implementation, the first and second contralateral sets of raised indicia can appear on the front or back of the card or on both. In addition the sets of raised indicia comply with the ISO 7811-3 and ISO 7813 standards for financial transaction cards.

In still another implementation, the raised indicia may be displayed in a different color so that those consumers with a limited vision can identify the raised indicia from the printed information by sight instead of by touch.

BRIEF DESCRIPTION OF THE DRAWINGS

Implementations of the invention will become more apparent from the detailed description set forth below when taken in conjunction with the drawings, in which like elements bear like reference numerals.

FIG. 7 shows schematic views of a financial token to illustrate implementations of a machine readable data region suitable for encoding with data.

DETAILED DESCRIPTION

Figure 1:
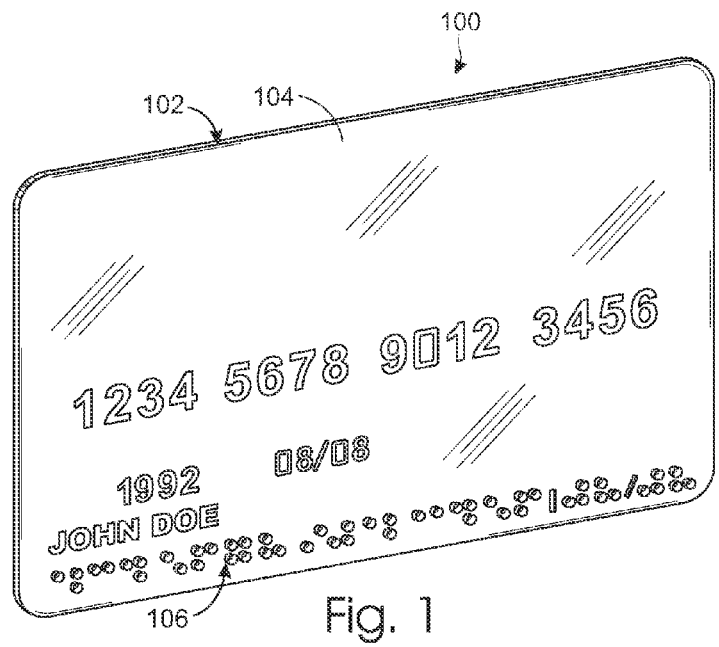
FIG. 1 is a front view of an exemplary financial transaction card for the visually impaired showing a first set of raised indicia, with each indicium denoting an alphabetic letter or a number.

With initial reference to FIG. 1, a machine readable, financial transaction card 100 has a body 102 preferably of plastic, with front, or first, major surface 104 that contains information that indicates the account number, expiration date, customer name. A first set of raised indicia 106 located in a region at the bottom of the card, in which each indicium denotes an alphabetic letter or a number. Each indicium, such as a Braille character for example, projects outward away from the first major surface. The first set of raised indicia 106 is read from left to right on the first major surface 102. The Braille characters on the front surface 104 of the card 100 allows a visually impaired person to read the corresponding account number and expiration date without assistance of another person or a machine. When Braille characters serve as the indicia, the standard six-dot or eight-dot systems is used. However, the dot placements will vary based on the localized Braille system for different countries, as different character patterns are used around the world.

Figure 2:
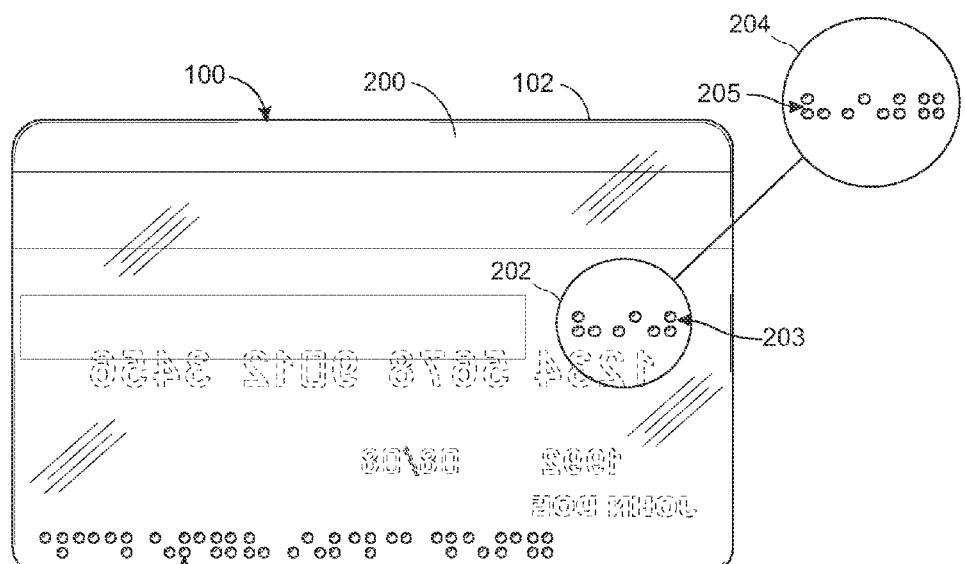
FIG. 2 is an exemplary back view of a financial transaction card for the visually impaired showing second and third sets of raised indicia, with each indicium denoting an alphabetic letter or a number.

FIG. 2 depicts a back, or second, major surface 200 on the opposite side of the body 102 from the first major surface. A second set of raised indicia 206 is located on the second major surface 200 in a region at the bottom of the card. Each indicium denotes an alphabetic letter or a number and projects outward away from the first major surface. The second set of raised indicia 206 is read from left to right on the second major surface 200. The second set of raised indicia 206 is illustrated as a plurality of Braille characters that indicate the account number, expiration date, customer name are not reversed. This allows the visually impaired to read the corresponding information from either side of the financial transaction card. The second set of raised indicia 206 is directly contralateral with the first set of raised indicia 106. As used herein, directly contralateral means that the two sets of raised indicia are located at related regions on opposites surfaces of the card, wherein, if the body of the card was transparent, one set of raised indicia would appear to be superimposed over the other set of raised indicia. Although in the illustrated example, the first and second sets of raised indicia 106 and 206 contain the same information, they could provide different information on each side of the card.

Directly contralateral positioning of the two sets of indicia 106 and 206 is possible because, the second set of raised indicia 206 is not formed by embossing and the first major surface 102 in FIG. 1 is devoid of any indication of the second set of raised indicia, e.g., there are no indentations in the first major surface related to the second set of raised indicia. Similarly, the first set of raised indicia 106 is not formed by embossing and the second major surface 200 in FIG. 2 is devoid of any indication of the first set of raised indicia, e.g., there are no indentations in the second major surface related to the first set of raised indicia. The first and second sets of raised indicia 106 and 206 are produced by depositing material, that form the individual projections of each indicium, on the respective surface 104 or 200 of the card body 102 by any of several well know techniques. Alternatively, a thicker card body can be machined, photolithographically etched or otherwise abraded to reduce the thickness, except where an indicium projection is desired. The projections that form the first and second sets of raised indicia 106 and 206 can be a distinctive color from that of the surrounding surface of the card so that users with a limited vision can identify the raised indicia from the printed information by sight instead of by touch.

To improve security, certain financial transaction cards, especially credit and debit cards, also have a security code that is referred to as a credit card verification or card code verification (CCV) number, located in a dedicated region 202 on the second major surface of the card. The CCV number is either a three or four digit non-raised number printed in that region 202. In the preferred embodiment of the present financial transaction card 100, a three digit CCV number also is encoded in the CCV region 202 by a third set of raised indicia 230, e.g. Braille characters, and alternative region 204 illustrates a four digit CCV number encoded in Braille.

Figure 3:
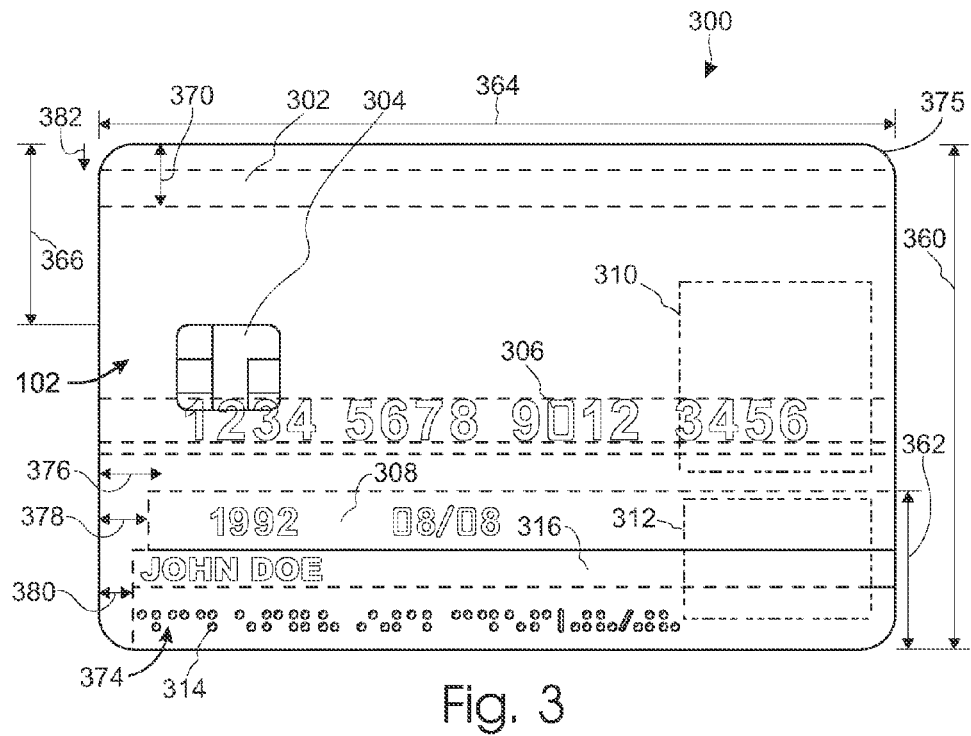
FIG. 3 illustrates the ISO standard regions on the front surface of a credit or debit card where Braille characters can not appear, such as regions reserved for an account number, expiration date, a hologram, and name of the consumer.

FIG. 3 is the front view of a machine readable, financial transaction card 300, i.e. the first major surface, illustrating various reversed regions as defined by the ISO 7811-3 and ISO 7813 standards. Dimension 360 represents the height of a standard credit card which can be in the range of 53.92 to 54.04 millimeters (2.123 to 2.217 inches) when the card is not embossed, up to a maximum of 54.18 mm (2.133 inches) when embossed. The front of a typical credit card includes the credit card brand logo 362, a hologram 310, and EMV integrated circuit chip 304. Dimension 362 represents the required distance from the bottom edge of the card to the top of embossing shown on a card which can be a maximum of 24.03 millimeters or (0.0946 inches) and Region 304 is the location of an minimum circlement area reserved for an radio frequency antenna which region has a 5 millimeter diameter centered 15.06 millimeters from the left edge and 23.89 millimeters from the top edge of a "Smart Card" embodiment. Regions 374 and 375 are safe areas on the card which can be 2.54 millimeters (0.1 inches) from the top and bottom edges, respectively, and wherein the raised indicia 314 indicate the customer name, account number and expiration date for the card. The raised indicia 314 read from left to right on the second major surface 401. Region 316 is the area on the card that indicates the customer's name by embossed alphabetic letters, above the safe area 374 for the Braille characters or other raised indicia. Region 380 is an area on the card that must remain blank and extends 6.055 millimeters from the left edge to the start of the first character of name and address embossing Region 316. Region 308 is the area on the card that has embossing showing the year the card is issued. Region 378 is an 8.585 millimeter wide area on the card that must remain blank from the left edge to the start of the first character in Region 308. Dimension 366 is a 19.23 millimeter distance from the top of the card to electrical contacts of an ICC smart card contacts, while Dimension 376 is a10.25 millimeter distance from the left edge to the electrical contacts. The corner radius 382 of the card can be 3.18 millimeters plus or minus 0.30 millimeters (0.125 inches plus or minus 0.012 inches). Region 370 illustrates the signature line area on the back of the card. Region 302 is the area on the card where the magnetic strip exists with the various contacts on the reverse side of the card. The card width 364 is between 85.47 and 85.72 millimeters, and nominally is 85.6 millimeters when the card is not embossed and 85.90 millimeters when embossed. Region 306 is the area on the card which indicates the account numbers for the particular financial transaction card and Region 312 is the area which may also contain a hologram and other electronic information.

Figure 4:
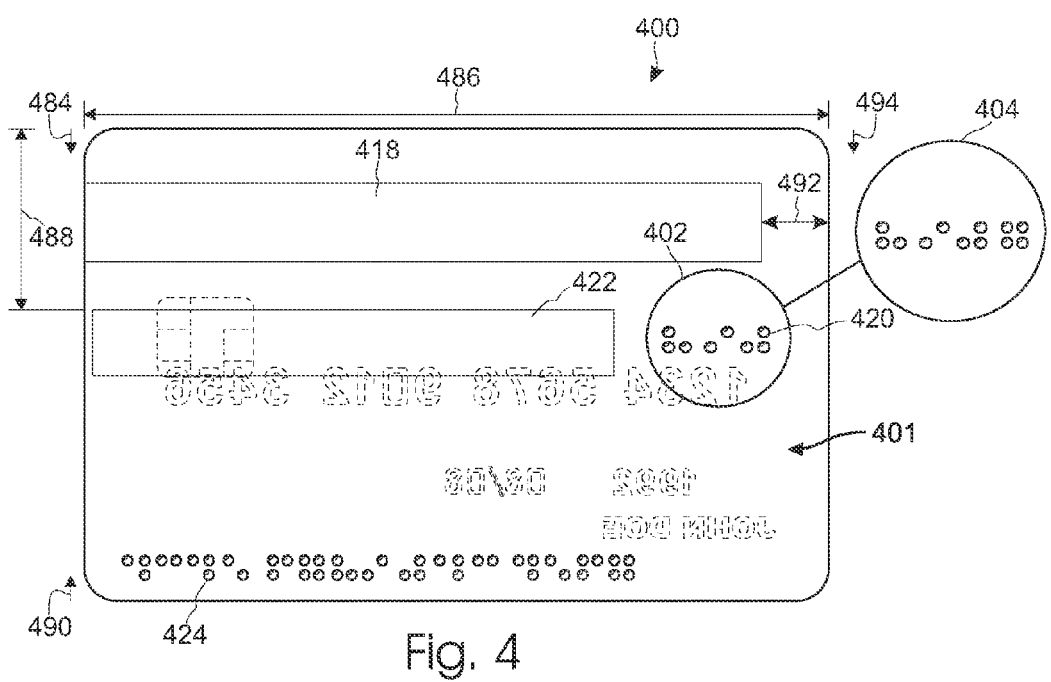
FIG. 4 illustrates the ISO standard regions on the back surface of a credit or debit card where Braille cannot appear, such as regions reserved a magnetic strip containing the financial information and the CCV card security code.

FIG. 4 is another embodiment of the second major surface 401 of a machine readable, financial transaction card 400. As used in the credit card industry, the credit card verification number usually resides on the back of the card. Region 402 is the region on the card that is reserved for the CCV numbers in Braille. Alternative CCV Region 404 shows a four digit CCV number in Braille and Region 402 represents the Braille markings for a three digit CCV number. The requirements of the mandatory distances are illustrated by dimension 494 which from the top of the card to the top of the magnetic stripe and must be 5.54 millimeters (0.218 inches). The magnetic stripe provides a machine readable data storage device by which a reader at an automatic teller machine or a cash register, for example can obtain data stored on the card. Other types of suitable machine readable data storage device include bar codes and wireless transponder circuits, for example. At the bottom of the card in Region 424 are raised Braille characters that correspond to the account number, customer name and expiration date and read from left to right on the second major surface 401. Region 490 is the safe area on the back of the card that is 2.54 millimeters (0.1 inches) from the top and bottom of the card. Region 488 is the area on the back of the card that extends from the top of the card to the bottom of the magnetic stripe and measures 11.89 millimeters (0.468 inches) minimum for a two track magnetic stripe and 15.82 millimeters (0.623 inches) minimum for a three track magnetic stripe. The length 486 of the magnetic stripe is a minimum of 82.55 millimeters (3.250 inches). Regions 484 and 490 are other safe areas on the back of the card that are 2.54 millimeters (0.1 inches) from the top and bottom edges of the card, respectively. Region 492 is the area on the back of the card between the magnetic stripe and the right edge of the card which is a maximum of 2.92 millimeters (0.115 inches).

Region 422 is the area on the second surface 401 for a hologram. Region 418 is the area on the second surface 401 for the customer's signature.

Figure 5:
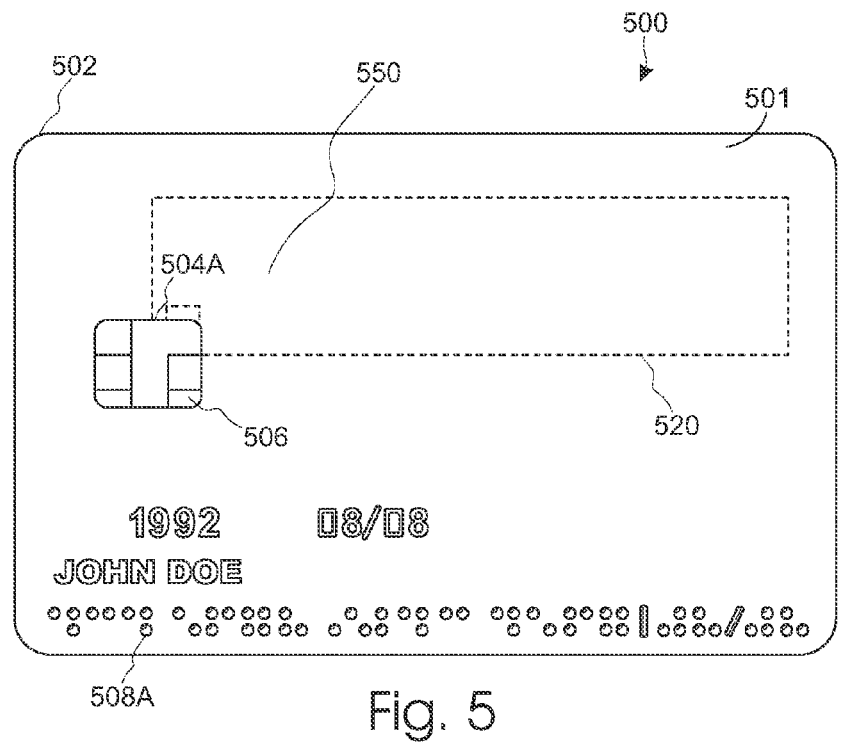
FIG. 5 is a schematic front view of the financial token indicating the ISO standard regions for certain information and a hologram, and on which Braille characters have been formed.

FIG. 5 represents the front, or first surface 501, of a financial transaction card 500. Region 508A contains a first set of raised indicia, such as Braille characters, that indicate the customer name, account number and expiration date. The corner radius 502 at the top of the card measures 3.18 millimeters plus or minus 0.30 millimeters (0.125 inches plus or minus 0.012 inches). Region 550 includes the magnetic stripe and Region 504A is provided for a hologram. Region 506 is also a location where some of the holographic information resides. Region 520 is the reverse side of the signature area.

Figure 6:
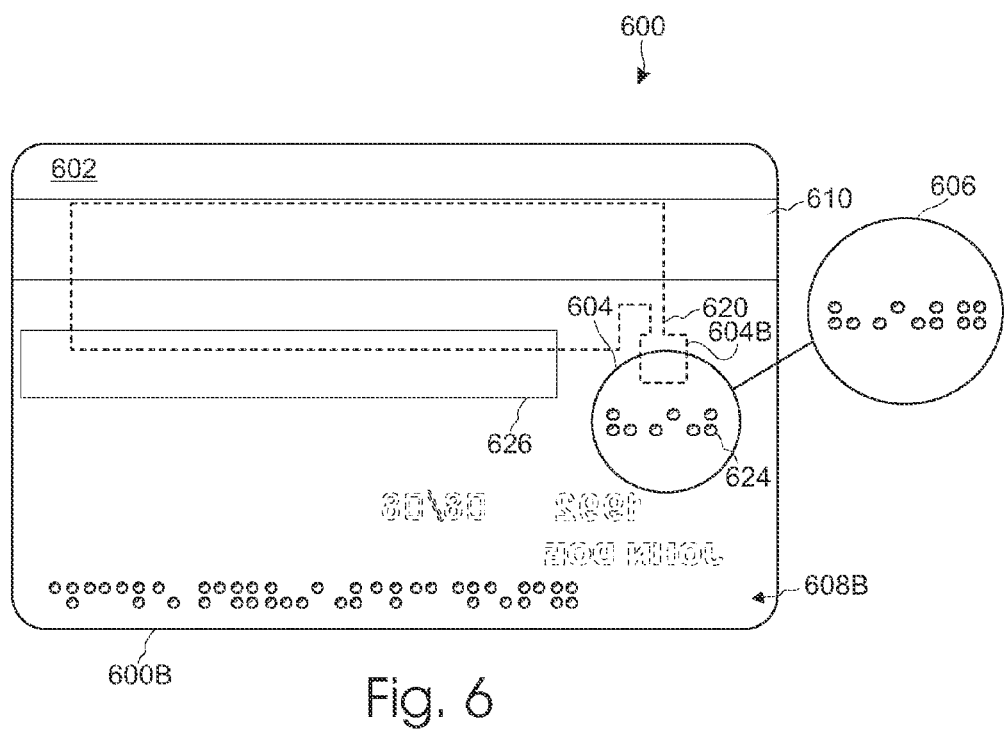
FIG. 6 is a schematic back view of the financial toke indicating the ISO standard regions for a magnetic strip and the corresponding Braille information and on which Braille information has been formed.

FIG. 6 depicts another preferred embodiment of a machine readable financial transaction card 600. Region 610 is the customer signature line. Region 604 contains a three digit CCV number in raised indicia 624 (e.g. Braille) and alternative Region 606 contains a four digit CCV number in similar raised indicia. Region 608B illustrates the expiration date in Braille characters. Region 600B is the safe area reserved for a second set of raised indicia, such as Braille characters. Region 602 is a safe area adjacent the top edge of the card and 626 that may contain an adhesive material and well as information from the issuer. Region 620 is a location where a radio frequency antenna may reside. Region 604B is an area on the card where additional electronic information may exist.

FIG. 7 shows exemplary implementations of a data encoding area of a machine readable financial transaction card 700 in which raised indicia (e.g. Braille), though not shown, are contemplated to be present. The data encoding area may include an optional shielding element, which allows desired electromagnetic, optical, or radiative signals to penetrate while protecting the data encoding area from physical abuse or damage. The machine readable financial transaction card 700 may optionally have areas outside of the data encoding area shielded from physical abuse or otherwise acceptable forms of electromagnetic radiation. Some of the acceptable signals that are allowed to penetrate the shielding and may include, but are not limited to, signals accompanying a magnetic field, RFID signals, IrDA signals, visible light, invisible light, modulated laser, and/or modulated RF communication signals. By way of example and not by way of limitation, a selective shielding element may comprise a clear plastic shield, conformal coatings, an opaque plastic shield, or a clear thin film, depending on the implementation of the data encoding area.

Non-limiting examples of the data encoding area are shown at reference numeral 700, and include a magnetic stripe assembly 710, an antenna and/or transceiver 720, and electrical contacts 740, The magnetic stripe assembly 710 may comprise, in one implementation 710A, a reprogrammable magnetic stripe 710B that accepts data and/or commands from a processor and formats and renders that data into a form on a magnetic stripe that is readable by conventional merchant magnetic stripe-reading point of sale (POS) terminals. In this manner, the processor may program a particular account for use in a transaction as a function of user input selecting the account. Alternatively, the processor may erase the magnetic stripe of the assembly 710, rendering the card useless in the event of its loss or theft. In one implementation shown 710A, the magnetic stripe assembly 710B at least partially slidably moves 710C into and out of an assembly of the machine readable financial transaction card 700 (partial view shown), allowing the machine readable financial transaction card 700 to conduct a financial transaction at a point of sale terminal that includes a magnetic stripe reader.

Also in FIG. 7 is an exemplary implementation of the data encoding area shown as an antenna and/or transceiver 720. The antenna 720 may include commonly used loop inductors such as the one shown 720A or in those shown in related ISO standards for RF-readable smart cards. With such an interface, account data may be translated, modulated and transmitted in a manner acceptable by an RF contactless merchant POS terminal, a 802.11 WiFi or WiMax network, or by a cellular or RF communications network.

External contacts 740 are yet another alternative implementation of the data encoding area shown in FIG. 7. With the machine readable financial transaction card 700 possessing physical contacts such as an array of conductive pads or shapes 740A, the machine readable financial transaction card 700 may be placed in physical contact with a merchant POS terminals, and the external contacts 740 may establish connectivity to the merchant's financial processing system. The processor may relay account-related information to the merchant POS terminal through the contact interface, thereby allowing the machine readable financial transaction card 700 to be utilized with the large number of preexisting merchant POS terminals.

In another implementation, a financial transaction card can have opposing first and second planar surfaces. Embossed in the card will be codes, numeric and/or alphabetic, to form raised indicia on the first surface with corresponding subsurface indicia on the second surface. That is, the indicia in the first surface will appear as crests and the second surface will show the indicia as troughs corresponding to the crests of the first surface. The codes will be an account number issued by an issuer, a name of an entity holding an account of the account number and to whom the issuer issued the account, an expiration date of the card, and their combinations. The card will also have Braille characters projecting from one or both of the first and second surfaces and corresponding to one or more of the codes. Stated otherwise, the Braille characters need not be embossed in the card but can be formed to project from the card without deforming the card as does embossing. This financial transaction card can be made, in another implementation, by forming a laminate having opposing first and second planar surfaces. The codes can be embossed into the laminate though the Braille characters need not be embossed. The laminate can be formed with a machine readable data region such as a magnetic stripe assembly for magnetically storing data, an integrated circuit chip for storing data, an antenna and/or transceiver in communication with the integrated circuit chip, an electrical contact on one or more of the first and second surfaces in communication with the integrated circuit chip, and a combination thereof.

In yet another implementation, a financial transaction can have Braille characters projecting from one or more opposing surfaces, where the surfaces need not be embossed, while the financial transaction card also has a machine readable data region to store data corresponding to the Braille characters (i.e., an account number issued by an issuer, a name of an entity holding an account of the account number and to whom the issuer issued the account, an expiration date of the card, and their combinations.)

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A financial transaction card comprising:
   a thin, planar body having a first major surface and a second major surface on an opposite side of the planar body from the first major surface, wherein:
      a first edge, a second edge, and a third edge each extend between the first and second major surfaces; and
      each of the first major surface and the second major surface has a respective data region:
         between the first edge and the second edge that is not less than about 6.05 mm from the first edge and not less than about 6.05 mm from the second edge; and
         in a range from about 2.54 mm to about 17.07 mm from the third edge;
   a first set of raised indicia within the respective data region of the first major surface, with each indicium denoting an alphabetic letter or a number and projecting outwardly away from the first major surface; and
   a second set of raised indicia within the respective data region of the second major surface, with each indicium denoting an alphabetic letter or a number and projecting outwardly away from the second major surface, wherein:
   at least one of the indicium in the second set is directly contralateral with at least one of the raised indicium in the first set;
      the first major surface is devoid of any indication of the second set of raised indicia; and
      at least one of the first set of raised indicia and the second set of raised indicia comprises Braille characters.

2. The financial transaction card as defined in claim 1 wherein each of the indicia in the first set of raised indicia comprises a plurality of projections extending from the first major surface.

3. The financial transaction card as defined in claim 1 wherein the financial transaction card is one of a prepaid transaction card, a debit card, and a credit card.

4. The financial transaction card as defined in claim 1, wherein the second major surface has a code region including a third set of raised indicia denoting a security code.

5. The financial transaction card as defined in claim 4, wherein the third set of raised indicia includes Braille characters compatible with the International Organization for Standardization (ISO) standard for data location on identification cards.

6. The financial transaction card as defined in claim 1, further comprising a machine readable data storage device.

7. The financial transaction card as defined in claim 1, wherein the first set of raised indicia is produced by one of machining the body, etching the body, and abrading the body.

8. The financial transaction card as defined in claim 1, wherein a thickness of each of the respective data regions is not more than about 0.26 mm from the corresponding major surface of the planar body.

9. A financial transaction card comprising:
a thin, planar body having a first major surface and a second major surface on an opposite side of the planar body from the first major surface;
a first set of raised indicia, with each indicium denoting an alphabetic letter or a number and projecting outwardly away from the first major surface; and
a second set of raised indicia, with each indicium denoting an alphabetic letter or a number and projecting outwardly away from the second major surface, wherein:
  at least one said indicium of the second set of raised indicia is directly contralateral with at least one said indicium of the first set of raised indicia;
  the first and second set of raised indicia are produced by one of machining the body, etching the body, and abrading the body;
  the first major surface is devoid of any indication of the second set of raised indicia;
  the second major surface is devoid of any indication of the first set of raised indicia; and
  at least one of the first set of raised indicia and the second set of raised indicia comprises Braille characters.

10. The financial transaction card as defined in claim 9 wherein the financial transaction card is one of a prepaid transaction card, a debit card, and a credit card.

11. The financial transaction card as defined in claim 9, wherein the second major surface has a region that includes a set of raised indicia denoting a security code.

12. The financial transaction card as defined in claim 9 further comprising a machine readable data storage device.

13. The financial transaction card as defined in claim 9, wherein:
a first edge, a second edge, and a third edge each extending between the first and second major surfaces;
each of the first and the second major surfaces has a respective data region:
  between the first edge and third edge that is not less than about 6.05 mm from the first edge and not less than about 6.05 mm from the third edge;
  in a range from about 2.54 mm to about 17.07 mm from the second edge; and
the first set of raised indicia is within the respective data region of the first major surface; and
the second set of raised indicia is within the respective data region of the second major surface.

14. The financial transaction card as defined in claim 13, wherein a corresponding apex of each raised indicium in the first set and the second set has a height that is not more than about 0.26 mm from the corresponding major surface of the planar body.

15. A financial transaction card comprising opposing first and second planar surfaces including:
a height in a range from about 53.92 millimeters to about 54.18 millimeters;
a width in a range from about 85.47 millimeters to about 85.90 millimeters, wherein:
  a first edge and a second edge extend between the first and second planar surfaces; and
  each of the first and the second planar surfaces has a respective data region:
    in a range from about 6.05 mm to about 79.85 mm from the first edge; and
    in a range from about 2.54 mm to about 17.07 mm from the second edge;
codes, numeric and alphabetic, embossed therein to form raised indicia on the first planar surface with corresponding subsurface indicia on the second planar surface, wherein the codes are selected from the group consisting of:
  an account number issued by an issuer;
  a name of an entity holding an account of the account number and to whom the issuer issued the account;
  an expiration date; and
  a combination of the forgoing; and
Braille characters projecting from each of the respective data regions of the first and second planar surfaces and corresponding to one or more of the codes, wherein a first portion of the Braille characters on the first planar surface is abraded to be directly contralateral to a second portion of the Braille characters on the second planar surface.

16. The financial transaction card as defined in claim 15, wherein the Braille characters projectioning from each of the first and second opposing planar surfaces are compatible with the International Organization for Standardization (ISO) standard for data location on identification cards.

17. The financial transaction card as defined in claim 15, wherein a thickness of each of the respective data regions is not more than about 0.26 mm from the corresponding planar surface of the planar body.

18. The financial transaction card as defined in claim 15, further comprising a machine readable region including an element that is selected from the group consisting of:
  a magnetic stripe assembly for magnetically storing data;
  an integrated circuit chip for storing data;
  an antenna and/or transceiver in communication with the integrated circuit chip;
  an electrical contact on one or more of the opposing first and second planar surfaces in communication with the integrated circuit chip; and
  a combination of two or more of the foregoing.

19. The financial transaction card as defined in claim 15, wherein the first planar surface is devoid of any indication of the Braille characters projecting from the second planar surface.

20. A method of making a financial transaction card, the method comprising:
forming a laminate having opposing first and second planar surfaces each having:
  a height in a range from about 53.92 millimeters to about 54.18 millimeters; and
  a width in a range from about 85.47 millimeters to about 85.90 millimeters,
wherein:
  a first and a second edge extend between the opposing first and second planar surfaces; and
  each of the opposing first and the second planar surfaces has a respective Braille region:
    in a range from about 6.05 mm to about 79.85 mm from the first edge;
    in a range from about 2.54 mm to about 17.07 mm from the second edge; and
    not more than 0.26 mm from the corresponding said planar surface;
forming Braille characters:
  projecting from each of the opposing first and second planar surfaces;
  within each of the respective Braille regions; and corresponding to one or more of codes selected from the group consisting of:
  an account number issued by an issuer;
  a name of an entity holding an account of the account number and to whom the issuer issued the account;
  an expiration date; and
  a combination of the forgoing, wherein at least a first portion of one said Braille character on the first planar surface is directly contralateral with at least a second portion of a second said Braille character on the second planar surface;

and forming the laminate to have a machine readable region suitable for encoding data corresponding to the one or more codes.

21. The method as defined in claim 20, further comprising embossing the laminate with alphanumeric representations of the codes.

22. The method as defined in claim 20, wherein the machine readable region further comprises an element that is selected from the group consisting of:
  a magnetic stripe assembly for magnetically storing data;
  an integrated circuit chip for storing data;
  an antenna and/or transceiver in communication with the integrated circuit chip;
  an electrical contact on one or more of the opposing first and second surfaces in communication with the integrated circuit chip; and
  a combination of the foregoing.

23. The method as defined in claim 20, wherein the forming of the Braille characters includes abrading the Braille characters into each of the first and second planar surfaces.

24. The method as defined in claim 20, wherein:
  the first planar surface is devoid of any indication of the Braille characters projecting from the second planar surface; and
  the second planar surface is devoid of any indication of the Braille characters projecting from the first planar surface.

25. The method as defined in claim 20, wherein forming the Braille characters includes at least one of machining the laminate, etching the laminate, and abrading the laminate.

26. The method as defined in claim 20, wherein the Braille characters are compatible with International Organization for Standardization (ISO) standard for data location on identification cards.

* * * * *